(12) United States Patent
Mérida et al.

(10) Patent No.: US 9,086,337 B2
(45) Date of Patent: Jul. 21, 2015

(54) DETECTING A WAKE SITUATION IN A WIND FARM

(71) Applicant: Alstom Renovables España, S.L., Barcelona (ES)

(72) Inventors: Sara Mérida, Barcelona (ES); Elena Menéndez Álvarez, Barcelona (ES)

(73) Assignee: ALSTOM RENOVABLES ESPANA, S.L., Barcelona (ES)

( * ) Notice: Subject to any disclaimer, the term of this patent is extended or adjusted under 35 U.S.C. 154(b) by 148 days.

(21) Appl. No.: 13/851,768

(22) Filed: Mar. 27, 2013

(65) Prior Publication Data

US 2013/0255363 A1  Oct. 3, 2013

Related U.S. Application Data

(60) Provisional application No. 61/652,713, filed on May 29, 2012.

(30) Foreign Application Priority Data

Mar. 29, 2012 (EP) .................................... 12382112

(51) Int. Cl.
| | |
|---|---|
| *G01M 9/00* | (2006.01) |
| *G01M 15/14* | (2006.01) |
| *F03D 7/04* | (2006.01) |
| *F03D 11/00* | (2006.01) |

(52) U.S. Cl.
CPC ............... *G01M 15/14* (2013.01); *F03D 7/048* (2013.01); *F03D 11/0091* (2013.01); *F05B 2270/1095* (2013.01); *F05B 2270/331* (2013.01); *Y02E 10/722* (2013.01); *Y02E 10/723* (2013.01)

(58) Field of Classification Search
CPC ............................ F03D 7/048; Y02E 10/723
USPC ......... 73/112.01, 147, 170.01, 170.05; 416/1, 416/61
See application file for complete search history.

(56) References Cited

U.S. PATENT DOCUMENTS

| | | | | |
|---|---|---|---|---|
| 8,839,656 | B2 * | 9/2014 | Frederiksen et al. | ........... 73/1.75 |
| 2010/0195089 | A1 * | 8/2010 | Wu et al. | ....................... 356/28.5 |

(Continued)

FOREIGN PATENT DOCUMENTS

| | | |
|---|---|---|
| EP | 2 128 438 | 12/2009 |
| GB | 2 481 461 | 12/2011 |
| NL | 2 005 400 | 3/2012 |

OTHER PUBLICATIONS

European Search Report for EP12382112, mailed Sep. 4, 2012, 4 pgs.

*Primary Examiner* — Eric S McCall
(74) *Attorney, Agent, or Firm* — Squire Patton Boggs (US) LLP

(57) ABSTRACT

In a first aspect, the present invention provides a method for detecting a wake situation in a wind farm comprising a plurality of wind turbines theoretically distributed according to a theoretical layout, one or more of the wind turbines having one or more load sensors. The method comprises obtaining, for one or more of the wind turbines with load sensors, load measurements from the load sensors during a predefined time interval. The method further comprises obtaining a qualified layout by qualifying in the layout each wind turbine for which load measurements have been obtained as overloaded or non-overloaded according to its load measurements. Finally, the obtained qualified layout is used to detect the wake situation.

20 Claims, 6 Drawing Sheets

(56) References Cited

U.S. PATENT DOCUMENTS

| | | |
|---|---|---|
| 2012/0133138 A1* | 5/2012 | Sorensen et al. ............... 290/44 |
| 2012/0263592 A1* | 10/2012 | Lind ............................... 416/61 |
| 2012/0279288 A1* | 11/2012 | Frederiksen et al. ...... 73/112.01 |
| 2013/0103202 A1* | 4/2013 | Bowyer et al. ................ 700/275 |
| 2014/0037447 A1* | 2/2014 | Attia ................................. 416/1 |

* cited by examiner

DETECTING A WAKE SITUATION IN A WIND FARM

This application claims the benefit of European Patent Application EP 12382112.6 filed Mar. 29, 2012 and U.S. Provisional Patent Application Ser. No. 61/652,713 filed May 29, 2012, the disclosures of which are hereby incorporated by reference in their entirety for all purposes.

The present invention relates to a method for detecting a wake situation in a wind farm.

The present invention also relates to a system suitable for carrying out such a method and to a wind farm comprising such a system.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The operation of the generator produces the electricity to be supplied into the electrical grid.

Wind turbines normally comprise pitch systems that are employed for adapting the position of the blades to varying wind conditions by rotating each blade along its longitudinal axis. This adaptation of the position of the blades is used to adjust the operation of the wind turbine. in terms of e.g. reducing or even stopping rotation of the rotor.

Wind turbines are often grouped together in so-called wind farms. In a wind farm there may be a relatively short distance between wind turbines. Thus, action of the wind on one wind turbine may produce a wake which may be received by another wind turbine. A wake received by a wind turbine may cause high loads (particularly vibrations) and/or a reduction of electrical power production in this wind turbine. These high loads may damage components of the wind turbine, and these damages may reduce the life and/or the performance of the wind turbine. Therefore, wakes in a wind farm should be avoided as much as possible.

Currently, it is known that some wake management strategies are defined by simulating loads for a theoretical layout and wind conditions. For every wind turbine in the layout, a set of adjustments in the operation of the wind turbine (e.g. stops) is defined for determined wind directions so that simulated loads will not theoretically result in damage for the wind turbine. These adjustments are entered in a control system (e.g. a SCADA control system) which applies them in the wind farm by e.g. sending suitable signals to e.g. the corresponding pitch systems, brakes, etc. The application of such adjustments in the operation of wind turbines is supposed to reduce loads in the wind farm.

Nevertheless, this known application of strategies may present many problems, mainly because it is complicated to measure wind conditions and because, even if the wind is measured with high accuracy, significant uncertainty may arise from the model used to estimate loads from the acquired wind data. For example, measurement of the wind direction may fail and thus the whole strategy may be poorly implemented. The detection of this kind of failures is complicated because it does not lead to immediate error, but to fatigue which may produce noticeable consequences only after a long time.

Besides, the measurements of wind speed are usually not performed in the affected machine because, when it is in a wake of a neighbouring wind turbine, all the measurements may be spoiled and of no use. This is the reason why the value of wind speed and direction for which the wake management strategy (e.g. an interruption) is defined is usually measured somewhere else in the site (e.g. in another wind turbine or a met mast which are not affected by a wake). This may lead to incorrect application of the wake management strategy because there could be differences in the wind measured by the reference wind turbine/met mast, and the wind actually affecting the wind turbine of study.

Another problem is that this type of strategies does not respond to changing needs due to changes in the external conditions such as construction of a neighbouring wind farm, variations in the forestry areas, etc. Said external conditions may generate wakes which have not been considered in the simulation of loads. Besides, certain deviations may exist between pre-defined wind turbine locations and the actual ones, so that the actual wind farm layout after installation can differ from the theoretical layout that is used in the initial simulations. These deviations may be significant or not.

In addition, if the input wind distribution used in the study does not correspond to the real wind distribution (both in wind speed and wind direction) then the pre-defined strategy might be useless or even prejudicial for the wind turbine loading and for total wind farm power output.

Furthermore, some layout conditions such as height differences between the wind turbines are usually not taken into account in the current definition of the wake management strategy. In some cases, this may lead to more adjustments in the operation of wind turbines than actually needed. The total production of electricity of the wind farm may thus be negatively affected.

Also, current wake models might not be accounting properly for the influence of "partial wake situations" leading to risky situations if this partial wakes happen often enough in a given layout.

SUMMARY OF THE INVENTION

There thus still exists a need for new systems and methods of detecting wake situations that resolve at least some of the above mentioned problems. It is an object of the present invention to fulfil such a need.

In a first aspect, the present invention provides a method for detecting a wake situation in a wind farm comprising a plurality of wind turbines theoretically distributed according to a theoretical layout, one or more of the wind turbines having one or more load sensors. The method comprises obtaining, for one or more of the wind turbines with load sensors, load measurements from the load sensors during a predefined time interval. The method further comprises obtaining a qualified layout by qualifying in the layout each wind turbine for which load measurements have been obtained as overloaded or non-overloaded according to its load measurements. Finally, the obtained qualified layout is used to detect the wake situation.

In this method, the monitoring of some loads of the wind turbines permits obtaining a qualified layout (e.g. a map) of the wind turbines in the wind farm. The qualified layout or map reflects which wind turbines are overloaded and which wind turbines are not overloaded. This qualified layout allows detecting wake situations in more or less real time. Thanks to this knowledge, a wake management strategy can be applied specifically for the situation that is being monitored and its efficiency could also be measured in more or less real time, thus allowing continuous improvement and adaptability.

An aspect of this method is that it may be independent of whether wind conditions are measured correctly or not. As explained before any malfunction in the devices measuring wind conditions may cause erroneous data and, thus, a method based on such erroneous data may not be very useful.

Furthermore, possible uncertainties in prior art methods arising from the accuracy of the model employed to estimate loads from wind measures is also eliminated as, in the proposed method, loads are directly measured. Indeed, load measurements are normally taken in each wind turbine by means of several load sensors, such as e.g. blade load sensors, accelerometers in/on the nacelle, potentiometers, etc. whereas wind measurements are not normally taken in the affected wind turbines. Thus, the load measurements may be more reliable and indicative of wind turbine fatigue than wind measurements. As a result, the wake management strategies may be improved, e.g. operation of wind turbines may be interrupted or curtailed less often.

In a second aspect of the invention, a system is provided for detecting a wake situation in a wind farm comprising a plurality of wind turbines theoretically distributed according to a theoretical layout, one or more of the wind turbines having one or more load sensors. The system is configured to perform a method substantially as hereinbefore described.

In a third aspect, the invention provides a wind farm comprising a plurality of wind turbines theoretically distributed according to a theoretical layout, one or more of the wind turbines having one or more load sensors and such a system.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 1b is a schematic representation of a theoretical layout of the wind farm of FIG. 1a;

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1A:
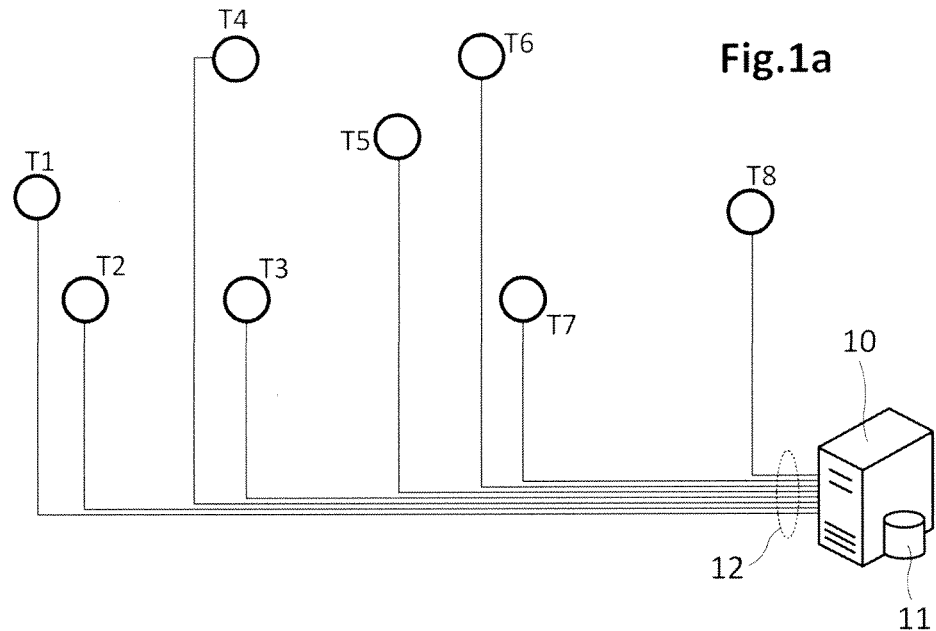
FIG. 1a is a schematic representation of a wind farm according to an embodiment of the wind farm of the invention.

FIG. 1a is a schematic representation of a wind farm according to an embodiment of the wind farm of the invention. This wind farm comprises a plurality of wind turbines T1-T8, which are conceptually represented in the figure as circles. Each of these wind turbines may have load sensors (not shown). The wind farm also comprises an embodiment of the system 10 for detecting a wake situation. The wind turbines T1-T8 are theoretically distributed within the wind farm according to a theoretical layout. This layout will be described below in relation to FIG. 1b.

The system 10 is connected 12 with each of the wind turbines T1-T8, such that the system 10 can receive load measurements from the wind turbines T1-T8 and can send proper signals to the wind turbines T1-T8 for adjusting their operation. The system 10 may comprise a repository 11 for obtaining and storing data related to wake situations. The system 10 may be configured to perform one or more embodiments of the method, such as e.g. those that will be explained in reference to FIGS. 2a-2d, to FIGS. 3a-3d, and to FIG. 4.

Figure 1B:
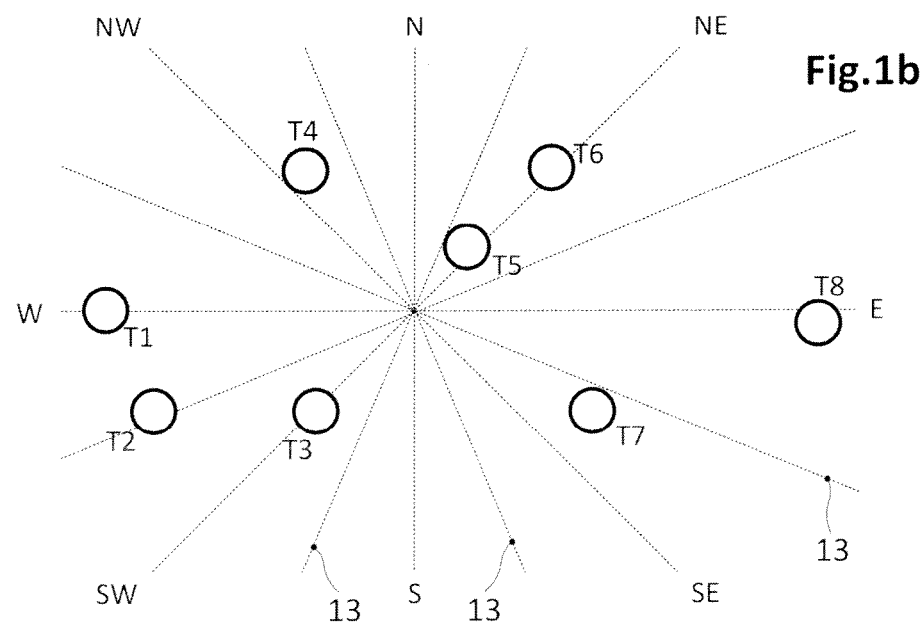

FIG. 1b is a schematic representation of a theoretical layout of the wind farm of FIG. 1a. As in the previous figure, the wind turbines are also represented as circles. FIG. 1b also shows a representation of reference lines for determining wind directions by means of broken lines. The line N-S refers to the direction North-South, the line W-E refers to the direction West-East, the line NW-SE refers to the direction North West-South East, and the line NE-SW refers to the direction North East-South West. Intermediate directions 13 may also be defined for better accuracy. Each direction has two senses. For reasons of simplicity, the rest of figures will only take into account the main reference lines commented before N-S, W-E, NW-SE and NE-SW.

Each possible sense of the wind will be generally referred in following descriptions as wind direction and a notation of the type "XX=>YY" will be used to indicate said sense, wherein "XX" indicates from where the wind is blowing and "YY" indicates towards where the wind is blowing. Thus, for example, S=>N represents the wind direction in which the wind blows from the South towards the North, and N=>S represents the wind direction in which the wind blows from the North towards the South, in both cases according to the reference line N-S.

Figure 2A:
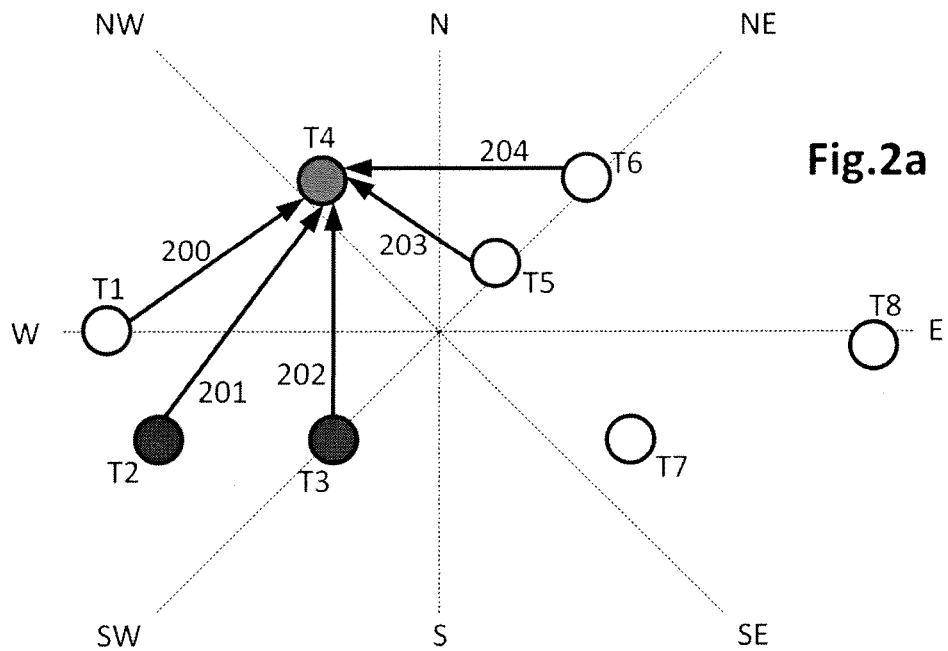
FIG. 2a illustrates a first qualified layout obtained from the theoretical layout of FIG. 1b and a first set of load measurements, said first qualified layout reflecting three overloaded wind turbines and several wind directions related to a first of the three overloaded wind turbines, according to an embodiment of the invention.

FIG. 2a shows a first qualified layout obtained from the theoretical layout of FIG. 1b and a first set of load measurements, said first qualified layout reflecting three overloaded wind turbines and several wind directions related to a first of the three overloaded wind turbines, according to an embodiment of the invention. This qualified layout reflects three overloaded wind turbines T2, T3, T4, which have been determined as overloaded according to the obtained load measurements. An average of the load measurements of each wind turbine may be obtained, and said average load may be compared with an average load threshold. Then, if the calculated average load is less than the average load threshold, the corresponding wind turbines T1 and T5-T8 may be qualified as non-overloaded. But, if the calculated average load is greater than the average load threshold, the corresponding wind turbines T2-T4 may be qualified as overloaded. This qualified layout also reflects several wind directions 200-204 related to a first wind turbine T4 of the three overloaded wind turbines. An alternative method of determining a wind turbine as overloaded may comprise taking into account e.g. a frequency of loads higher than a predefined threshold and/or time intervals during which the measured loads are higher than a predefined threshold. The determination of whether a wind turbine is overloaded or not may depend e.g. on the load sensors provided on the wind turbines.

These wind directions 200-204 of FIG. 2a constitute a set of wind directions related to the overloaded wind turbine T4. This set may be obtained in such a way that it contains the wind directions that can theoretically generate a wake that can be received by the overloaded wind turbine T4 when taking into account the layout of the wind farm shown in FIG. 1b. A first of the wind directions 200 refers to the wind blowing substantially from the South-West towards the North-East (SW=>NE) and to this wind acting on the wind turbine T1. in such a way that a wake may theoretically be generated which can be received by the overloaded wind turbine T4. Taking into account this principle, the direction 201 refers to a wind that is substantially SW=>NE acting on the wind turbine T2, the direction 202 refers to a wind that is substantially S=>N acting on the wind turbine T3, the direction 203 refers to a wind that is substantially SE=>NW acting on the wind turbine T5, and the direction 204 refers to a wind that is substantially E=>W acting on the wind turbine T6.

Figure 2B:
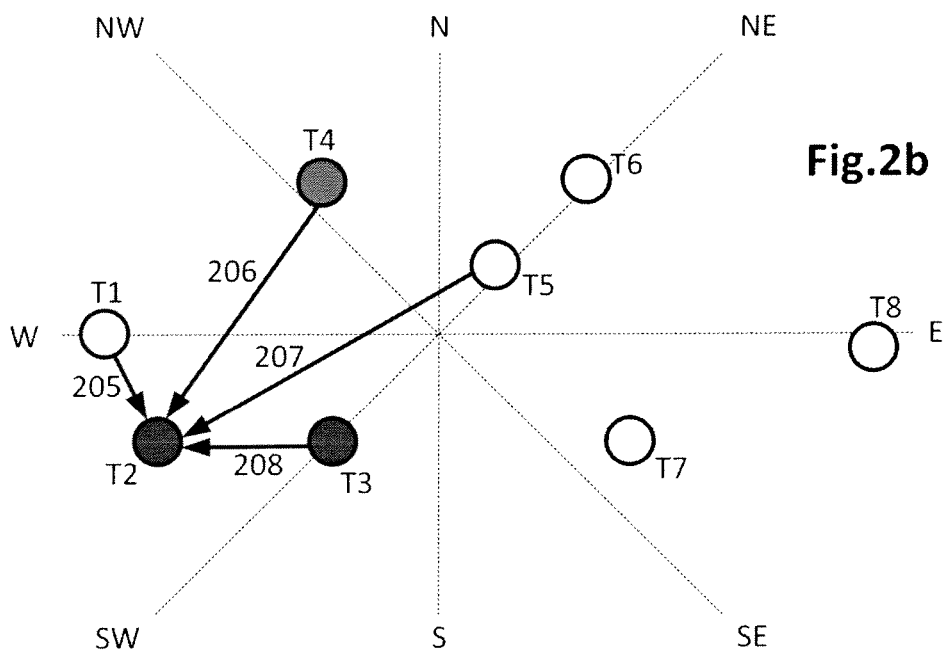
FIG. 2b illustrates the qualified layout of FIG. 2a but in this case reflecting several wind directions related to a second of the three overloaded wind turbines, according to the same embodiment.

FIG. 2b shows the qualified layout of FIG. 2a but in this case reflecting several wind directions related to a second of the three overloaded wind turbines. In this case, all the shown wind directions 205-208 constitute a set of wind directions related to the overloaded wind turbine T2. The direction 205 refers to a wind that is substantially NW=>SE acting on the wind turbine T1, the direction 206 refers to a wind that is substantially NE=>SW acting on the wind turbine T4, the direction 207 refers to a wind that is substantially NE=>SW acting on the wind turbine T5, and the direction 208 refers to a wind that is substantially E=>W acting on the wind turbine T3.

Figure 2C:
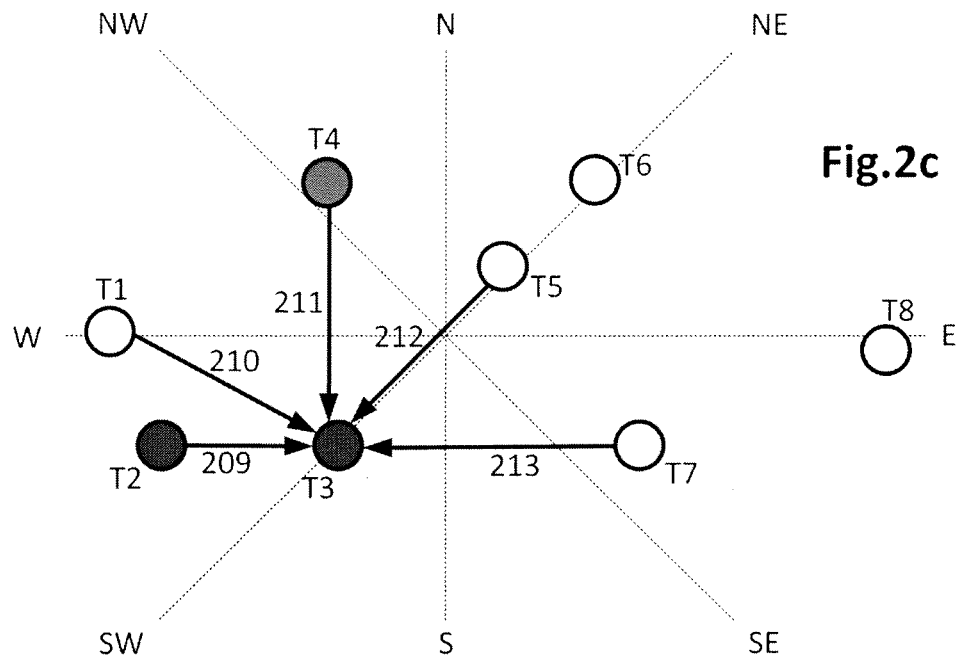
FIG. 2c illustrates the qualified layout of FIG. 2a but in this case reflecting several wind directions related to a third of the three overloaded wind turbines, according to the same embodiment.

FIG. 2c shows the qualified layout of FIG. 2a but in this case reflecting several wind directions related to a third of the three overloaded wind turbines. In this case, all the shown wind directions 209-213 constitute a set of wind directions related to the overloaded wind turbine T3. The direction 209 refers to a wind that is substantially W=>E acting on the wind turbine T2, the direction 210 refers to a wind that is substantially NW=>SE acting on the wind turbine T1, the direction 211 refers to a wind that is substantially N=>S acting on the wind turbine T4, the direction 212 refers to a wind that is substantially NE=>SW acting on the wind turbine T5, and the direction 213 refers to a wind that is substantially E=>W acting on the wind turbine T7.

The directions 200-204 of FIG. 2a, the directions 205-208 of FIG. 2b, and the directions 209-213 of FIG. 2c permit concluding that any of the following wind directions can cause a wake that may be received by at least one of the overloaded wind turbines T2-T4:

SW=>NE, SE=>NW and E=>W (related to the overloaded wind turbine T4—FIG. 2a);
NW=>SE, NE=>SW, NE=>SW and E=>W (related to the overloaded wind turbine T2—FIG. 2b); and
W=>E, NW=>SE, N=>S, NE=>SW and E=>W. (related to the overloaded wind turbine T3—FIG. 2c).

Duplicate wind directions may be eliminated from these results, in which case the set of wind directions related to at least one of the overloaded wind turbines T2-T4 will have the following content: W=>E, E=>W, N=>S, NE=>SW, NW=>SE, S=>N, SE=>NW, SW=>NE, and W=>E. Then, detection of the wake situation may be performed by determining the most likely actual wind direction from said set of wind directions.

In some embodiments, the method may comprise selecting the wind directions that are common to all the overloaded wind turbines T2-T4. Still in reference to the example of FIGS. 2a, 2b and 2c, only the wind direction E=>W can theoretically cause a wake on each of the overloaded wind turbines T2-T4. Action of an E=>W wind on the wind turbine T6 can theoretically generate a wake which can be received by the wind turbine T4 (arrow 204 of FIG. 2a). Action of an E=>W wind on the wind turbine T3 can theoretically generate a wake which can be received by the wind turbine T2 (arrow 208 of FIG. 2b). And action of an E=>W wind on the wind turbine T7 can theoretically generate a wake which can be received by the wind turbine T3 (arrow 213 of FIG. 2c).

Figure 2D:
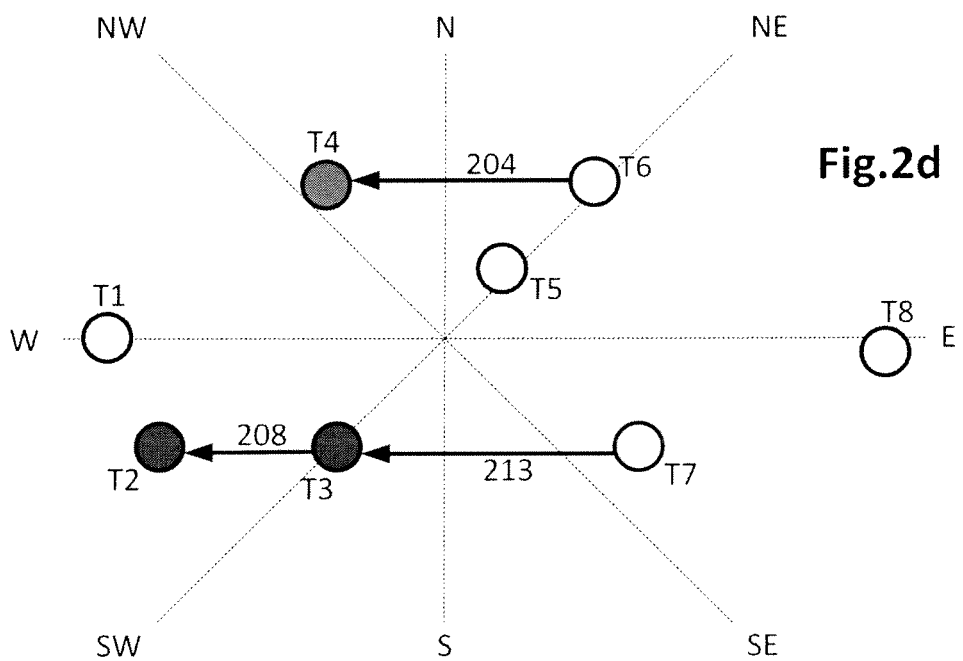
FIG. 2d illustrates a detected wake situation derived from the qualified layout and the wind directions reflected in FIGS. 2a, 2b and 2c, according to the same embodiment.

FIG. 2d shows a detected wake situation derived from the qualified layout and the wind directions reflected in FIGS. 2a, 2b and 2c, according to the same embodiment of the invention. This detected wake situation comprises all the wake generations which have in common a wind direction from the East towards the West E=>W, as explained in the previous paragraph. Thus, FIG. 2d shows the arrow 204 from FIG. 2a, the arrow 208 from FIG. 2b, and the arrow 213 of FIG. 2c.

The above explained identification of directions based on cardinal and intermediate points (N, S, E. W. NE, SE . . . ) is very suitable for explaining embodiments of the invention. Nevertheless, this identification does not necessarily mean e.g. that all the cardinal and intermediate points/directions are scanned for each turbine in search of wakes. Some embodiments may e.g. only take into account those directions that, according to the theoretical layout. involve a turbine which may generate a wake. Thus, these directions based on cardinal and intermediate directions used herein must be understood only as a suggestive way of identifying wind directions, without any kind of logic or algorithm implicit in them.

Figure 3A:
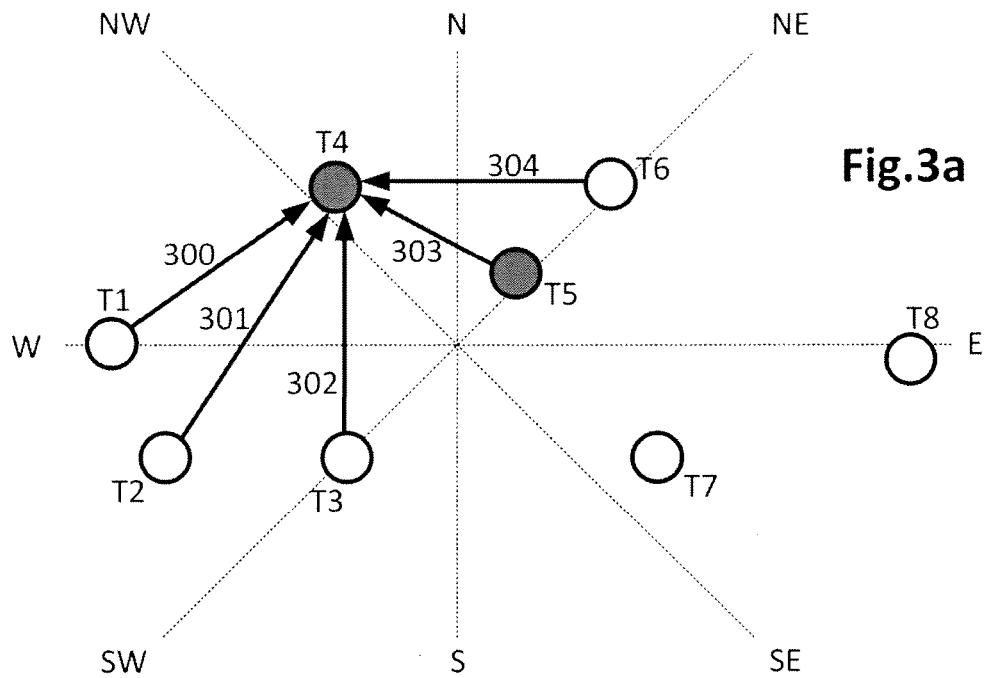
FIG. 3a illustrates a second qualified layout obtained from the theoretical layout of FIG. 1b and a second set of load measurements, said second qualified layout reflecting two overloaded wind turbines and several wind directions related to a first of the two overloaded wind turbines, according to an embodiment of the invention.
Figure 3B:
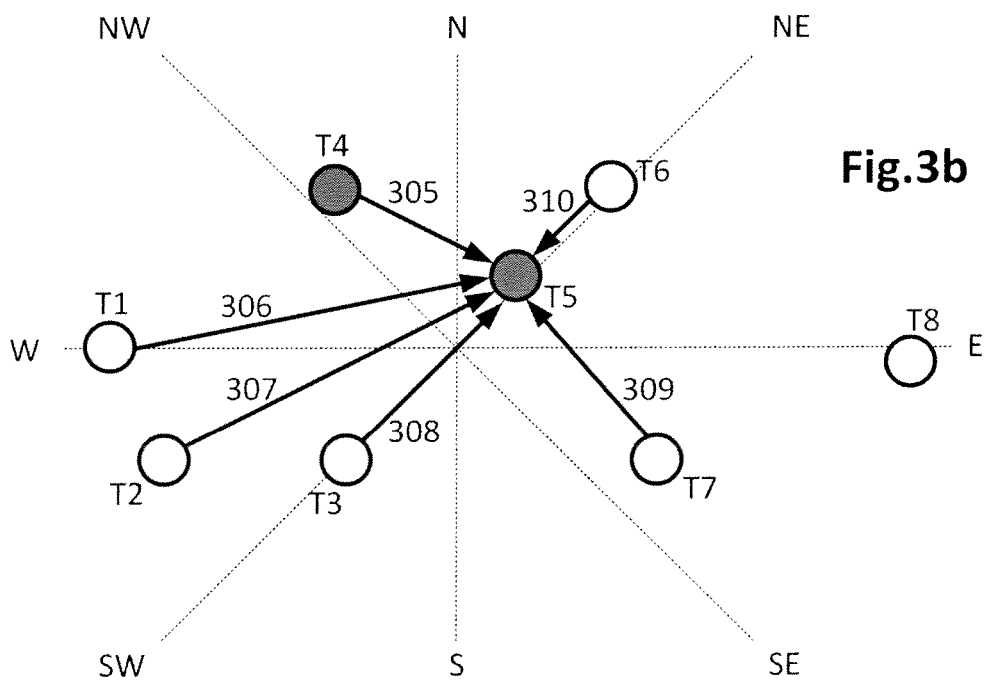
FIG. 3b illustrates the qualified layout of FIG. 3a but in this case reflecting several wind directions related to a second of the two overloaded wind turbines, according to the same embodiment.
Figure 3C:
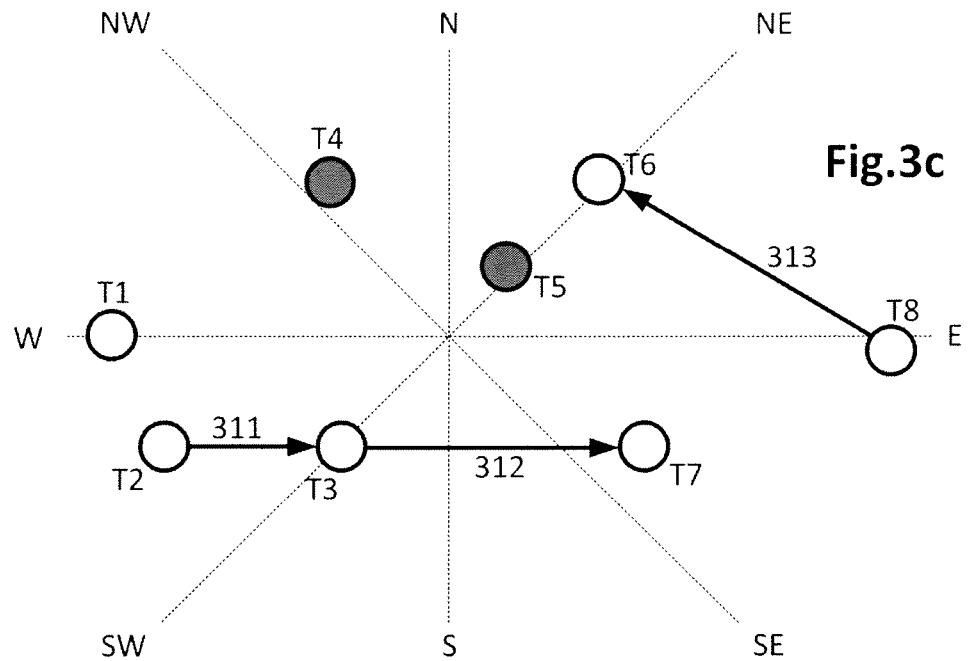
FIG. 3c illustrates the qualified layout of FIG. 3a but in this case reflecting several wind directions related to some non-overloaded wind turbines, according to the same embodiment.
Figure 3D:
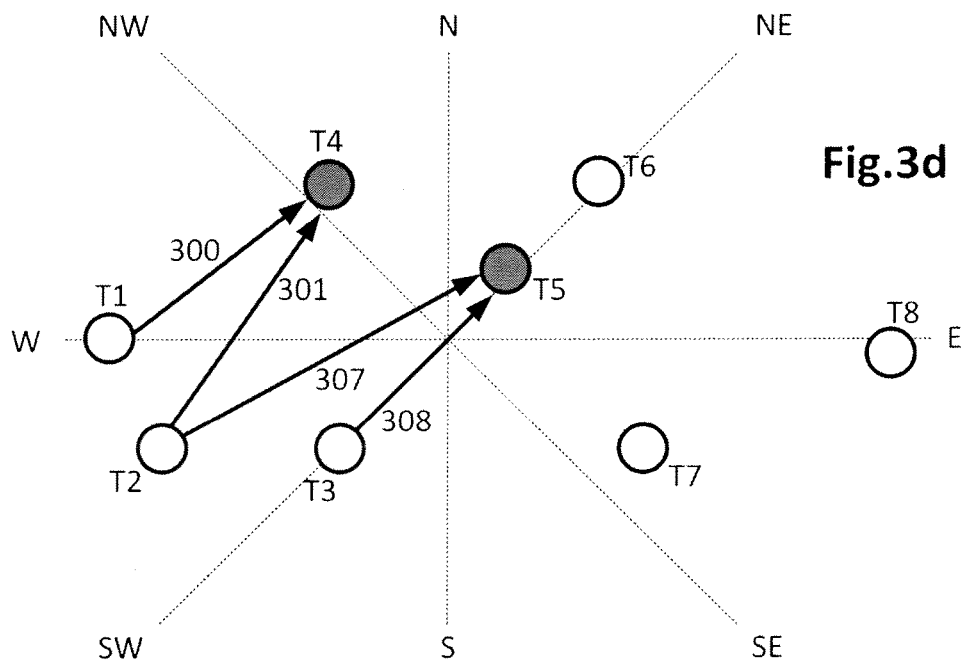
FIG. 3d illustrates a detected wake situation derived from the qualified layout and the wind directions of FIGS. 3a, 3b and 3c, according to the same embodiment.

FIG. 3a illustrates a second qualified layout obtained from the theoretical layout of FIG. 1b and a second set of load measurements, said second qualified layout reflecting two overloaded wind turbines and several wind directions related to a first of the two overloaded wind turbines, according to another embodiment of the method of the invention. FIG. 3b illustrates the qualified layout of FIG. 3a but in this case reflecting several wind directions related to a second of the two overloaded wind turbines, according to the same embodiment of the method. FIG. 3c illustrates the qualified layout of FIG. 3a but in this case reflecting several wind directions related to some non-overloaded wind turbines, according to the same embodiment of the method. And FIG. 3d illustrates a detected wake situation derived from the qualified layout and the wind directions of FIGS. 3a, 3b and 3c, according to the same embodiment of the invention.

In the case of FIGS. 3a-3d, similar principles to those explained in reference to FIGS. 2a-2d may be applied to e.g. detect the two overloaded wind turbines T4, T5 and/or to determine wind directions 300-310 related to the overloaded wind turbines. Taking this into account in FIG. 3a, the direction 300 refers to a wind that is substantially SW=>NE acting on the wind turbine T1, the direction 301 refers to a wind that is substantially SW=>NE acting on the wind turbine T2, the direction 302 refers to a wind that is substantially S=>N acting on the wind turbine T3, the direction 303 refers to a wind that is substantially SE=>NW acting on the wind turbine T5, and the direction 304 refers to a wind that is substantially E=>W acting on the wind turbine T6.

In FIG. 3b, the direction 305 refers to a wind that is substantially NW=>SE acting on the wind turbine T4, the direction 306 refers to a wind that is substantially W=>E acting on the wind turbine T1, the direction 307 refers to a wind that is substantially SW=>NE acting on the wind turbine 12, the direction 308 refers to a wind that is substantially SW=>NE acting on the wind turbine T3, the direction 309 refers to a wind that is substantially SE=>NW acting on the wind turbine T7, and the direction 310 refers to a wind that is substantially NE=>SW acting on the wind turbine T6.

The directions 300-304 of FIG. 3a, and the directions 305-310 of FIG. 3b permit concluding that any of the following wind directions can cause a wake that may be received by at least one of the overloaded wind turbines T4-T5:

SW=>NE, S=>N, SE=>NW, and E=>W (related to the overloaded wind turbine T4—FIG. 3a); and NW=>SE, W=>E, SW=>NE, SW=>NE, SE=>NW, and NE=>SW (related to the overloaded wind turbine T5—FIG. 3b).

Duplicate wind directions may be eliminated from these results, in which case the set of wind directions related to all the overloaded wind turbines T4-T5 will have the following content: E=>W, NE=>SW, NW=>SE, S=>N, SE=>NW, SW=>NE, and W=>E. Then, detection of the wake situation may be performed by determining the most likely actual wind direction from said set of wind directions.

The set of wind directions of the previous paragraph may be refined by selecting only the wind directions that are related to all the overloaded wind turbines T4, T5. According to this principle, only the wind directions SW=>NE and SE=>NW are related to all the overloaded wind turbines T4, T5. A wind SW=>NE acting on the turbine T1 and on the turbine T2 can generate a wake that can be received by the turbine T4 (arrows 300 and 301 of FIG. 3a), a wind SW=>NE acting on the turbine T2 can generate a wake that can be received by the turbine T5 (arrow 307 of FIG. 3b), and a wind SW=>NE acting on the turbine T3 can generate a wake that can be received by the turbine T5 (arrow 308 of FIG. 3b). And a wind SE=>NW acting on the turbine T5 can generate a wake that can be received by the turbine T4 (arrow 303 of FIG. 3a), and a wind SE=>NW acting on the turbine T7 can generate a wake that can be received by the turbine T5 (arrow 309 of FIG. 3b).

An alternative to select only the wind directions that are related to all the overloaded wind turbines may be e.g. selecting the wind directions that are related to at least the 90% (or other suitable predefined percentage) of the overloaded wind turbines. This alternative permits discarding at this step fewer wind directions, in which case the risk of obtaining an empty set of wind directions related to overloaded wind turbines is reduced. Thus, if an empty set is obtained at this step or subsequent steps restricting the conditions under which wind directions are selected, the process may be rolled back to said step taking into account a smaller percentage of overloaded wind turbines, such that a non-empty set of wind directions may be obtained.

In some embodiments, the determination of the most likely actual wind direction may comprise verifying, for each wind direction of the set of wind directions related to the overloaded wind turbines, if said wind direction can theoretically generate a wake that can be received by at least one of the non-overloaded wind turbines. Then, in case of positive result of said verification, said wind direction may be excluded from the set of wind directions related to the overloaded wind turbines.

For example, FIG. 3c shows a wind direction 313 of the type SE=>NW which can theoretically generate a wake that can be received by a non-overloaded wind turbine T6. Therefore, exclusion of the direction SE=>NW from the set of wind directions related to overloaded wind turbines produces a new set only containing the direction SW=>NE, which may be selected as the most likely actual wind direction.

FIG. 3d shows a detected wake situation derived from the qualified layout and the wind directions reflected in FIGS. 3a, 3b and 3c, according to the same embodiment of the invention. This detected wake situation comprises all the wake generations which have in common a wind direction from the South West towards the North East SW=>NE, as explained in the previous paragraph. Thus, FIG. 3d shows the arrow 300 from FIG. 3a, the arrow 301 from FIG. 3a, the arrow 307 from FIG. 3b, and the arrow 308 from FIG. 3b.

An alternative to excluding those wind directions that can theoretically generate a wake that can be received by at least one of the non-overloaded wind turbines, may be only excluding the wind directions that can theoretically generate a wake that can be received by at least the 10% (or other suitable predefined percentage) of the non-overloaded wind turbines. Another alternative may be only excluding the wind directions that are related to at most the 90% (or other suitable predefined percentage) of the overloaded wind turbines, and that can theoretically generate a wake that can be received by at least the 10% (or other suitable predefined percentage) of the non-overloaded wind turbines. These alternatives also permit discarding at this step fewer wind directions, in which case the risk of obtaining an empty set of wind directions related to overloaded wind turbines is reduced. As previously explained about other aspects of the method, performance of the method may also be rolled back under suitable conditions, such as e.g. varying predefined percentages for selecting and/or excluding wind directions.

Further alternatives to taking into account the wind directions that may theoretically cause a wake in non-overloaded wind turbines, may be to take into account the values of the loads in each of the overloaded turbines: e.g. if a particular overloaded wind turbine suffers significantly more vibrations than other overloaded wind turbines, this information may be taken into account by selecting from the remaining possible wind directions, the ones that are most likely to strongly affect this particular overloaded wind turbine, e.g. because another wind turbine is particularly close in this direction.

Yet a further alternative is implementing a predefined wake strategy according to a first of the remaining wind directions and verifying whether the wake situation is resolved or not. This first of the remaining wind direction may correspond e.g. to the wind direction that is most likely to occur according to the theoretical wind distribution of the site. If the wake situation is not resolved in this way, a wake strategy may be implemented for a second of the remaining wind directions and it may be verified whether the wake situation is resolved or not etc.

Figure 4:
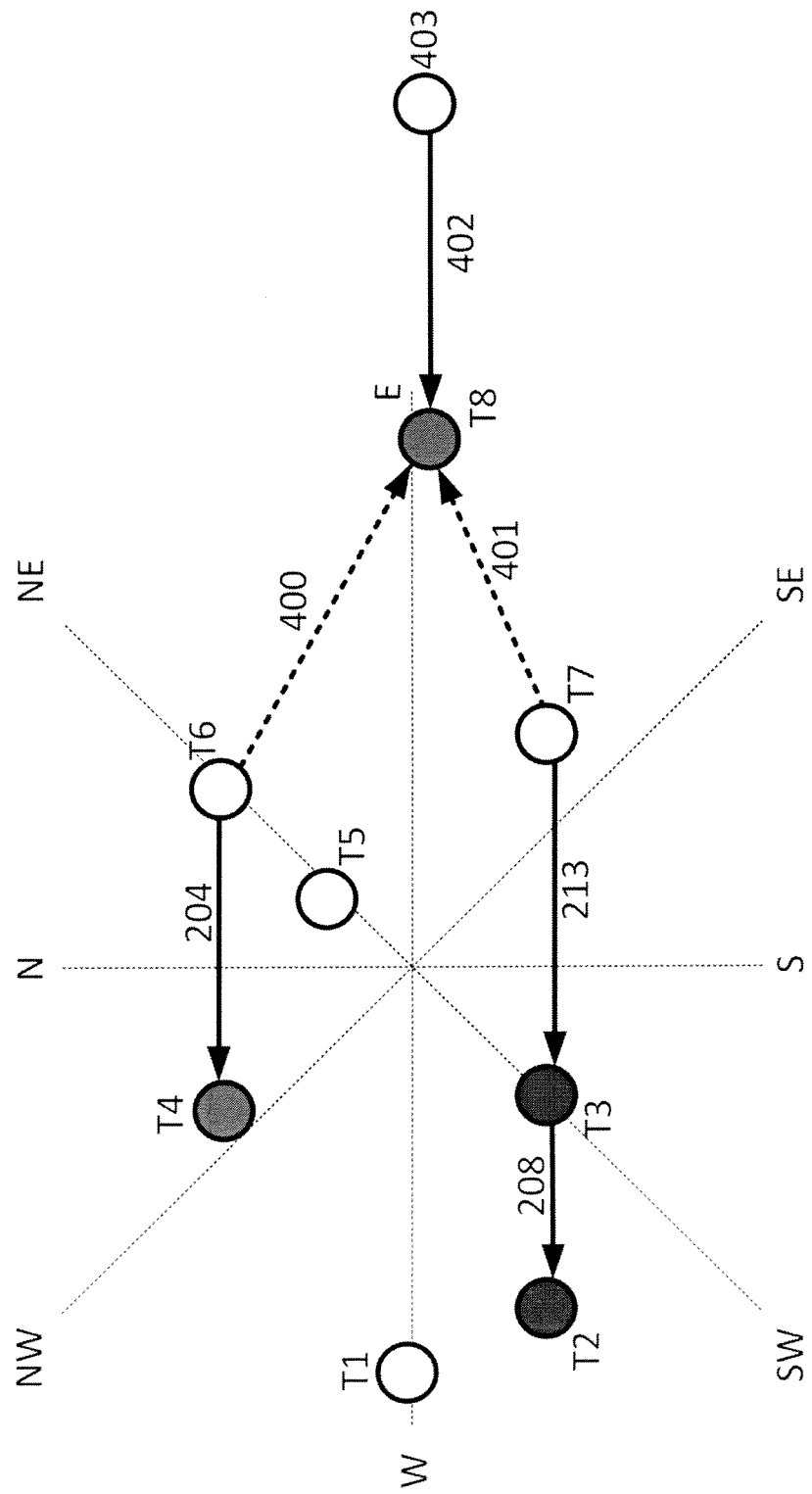
FIG. 4 illustrates an unsolved wake situation which may cause generation of an alarm signal, according to a further embodiment of the method.

FIG. 4 illustrates an unsolved wake situation which may cause generation of an alarm signal, according to a further embodiment of the method. In this case, the embodiments of the method explained before may not produce a completely consistent wake situation as detected. FIG. 4 refers to almost the same example of FIGS. 2a-2d, with the only difference of that the turbine T8 is also overloaded.

FIG. 4 shows the arrows 204, 208 and 213 which may be considered wake generations consistently explaining why the turbines T2. T3 and T4 are overloaded. Nevertheless, the overload of the turbine T8 is not consistently explained by said arrows 204, 208 and 213 which correspond to the wind direction E=>W. It must be noted that T1 is not overloaded by any potential wake generated at T8 as the distance between both wind turbines is quite large. The arrow 400 refers to a wind direction of the type NW=>SE acting on the turbine T6 which may generate a wake that may be received by the overloaded turbine T8. The arrow 401 refers to a wind direction of the type SW=>NE acting on the turbine T7 which may generate a wake that may be received by the overloaded turbine T8.

Still in reference to the example of FIG. 4, the direction E=>W is related to the turbines T2, T3 and T4 but not to the turbine T8, which has NW=>SE and SW=>NE as related directions. In this case or similar cases, in which some inconsistency is detected, an alarm signal may be generated in order to cause investigation of such an inconsistency. In the particular case of FIG. 4, an external element 403 may be the cause of the inconsistency. This external element 403 may be e.g. another wind turbine recently installed and, consequently, not considered in the theoretical layout. Thus, the generated alarm may be received by the operators in charge of maintaining the wind farm, in which case said operators may undertake the corresponding investigation and perform the corresponding adjustments in the theoretical layout of the wind farm. In this particular case, the external element 403 should be included in the theoretical layout because it can generate a wake 402 that may cause overload of the turbine T8 under a wind direction E=>W which is completely consistent with the wakes 204, 208 and 213.

Wind turbines within the farm itself may also generate inconsistencies of the type explained in the previous paragraph. For example, an internal element (wind turbine) whose real location is incorrectly reflected in the theoretical layout may cause wakes which may not be derivable from the theoretical layout. However, according to the principles of the previous paragraph, an alarm indicating detection of some inconsistency may be generated. Then, the operators of the farm may react accordingly by e.g. investigating the inconsistency and correcting the theoretical layout.

The previously described embodiments of the method are based on estimating wind directions from the qualified layout. In this type of embodiments (based on estimating wind directions), the method may further comprise applying a predefined strategy of adjusting wind turbines operation theoretically suitable for solving the detected wake situation. Moreover, in any of said embodiments, the method may be iterated until the detected wake situation is solved or an ending condition is satisfied. In these cases, determining the most likely actual wind direction may comprise excluding the wind directions that have been determined as most likely actual wind directions in previous iterations, such that a same wind direction will not be reprocessed. The ending condition may be considered satisfied when all the wind directions of the set of wind directions related to the overloaded wind turbines have been determined as most likely actual wind directions in previous iterations. The detected wake situation may be considered solved when the qualified layout comprises a number of overloaded wind turbines which is less than a predefined threshold of overloaded wind turbines.

Optionally, in the first iteration, the wind direction that is most likely to occur according to the theoretical wind distribution for the site may be used. In the second iteration, if the wake management strategy according to the first direction does not sufficiently resolve the wake, the second most likely wind direction according to the theoretical wind distribution may be used, etc.

Alternatively to the embodiments based on estimating wind directions, the wake situation may be detected by comparing the qualified layout with predefined patterns. In these embodiments, detecting the wake situation from the qualified layout may comprise comparing the qualified layout with predefined wake situations (or patterns), and producing a set of matched predefined wake situations according to predefined matching criteria. Then, a predefined wake situation may be selected from this set of matched predefined wake situations according to predefined selection criteria, and this selected predefined wake situation may be taken as the detected wake situation.

The predefined matching criteria may be e.g. a certain level of correspondence (which may be expressed as a certain percentage) between the predefined wake situation and the actual wake situation.

In the embodiments based on comparison with patterns, the method may further comprise applying a predefined strategy of adjusting wind turbines operation theoretically suitable for solving the detected wake situation. Moreover, in any of said embodiments, the method may be iterated until the detected wake situation is solved or an ending condition is satisfied. In these cases, selecting one of the predefined wake situations from the set of matched predefined wake situations may comprise excluding the predefined wake situations selected in previous iterations, such that a same predefined wake situation will not be reprocessed. The ending condition may be considered satisfied when all the predefined wake situations of the set of matched predefined wake situations have been selected in previous iterations. The detected wake situation may be considered solved when the qualified layout comprises a number of overloaded wind turbines which is less than a predefined threshold of overloaded wind turbines. Optionally, the likeliness of a certain wind direction occurring according to the theoretical wind distribution may be taken into account in the order of the iterations.

Alternatively to the embodiments based on estimating wind directions and to the embodiments based on comparison with patterns, the method may comprise a combination of both. In other words, in these alternative embodiments, the method may comprise performing a method based on estimating wind directions, and performing a method based on comparison with patterns. Methods based on estimating wind directions may further comprise storing the qualified layout as predefined wake situation into a repository, if the detected wake situation has been solved by estimating wind directions. In the methods based on comparison with patterns, comparing the qualified layout with predefined wake situations may comprise obtaining the predefined wake situations from said repository.

The alternative embodiments of the previous paragraph offer a very high flexibility, since, depending on the particular situations in which the method is to be used, different advantages may be obtained. For example, depending on particular features of the wind farm (e.g. number of wind turbines, more usual wind conditions, etc.) both types of methods (the one based on wind directions and the one based on patterns) may be performed in parallel or in series.

In a wind farm with relatively variable wind conditions, two different threads may run in parallel, one of the threads performing the method based on comparison with patterns, and the other thread performing the method based on estimating wind directions. This parallel execution of the threads may be seen as a race, the winner of which will be the first thread solving the wake situation. This parallel approach may permit obtaining results in a very short time if appropriated computing resources are available.

If, for example, more constant wind conditions are present in a wind farm, the method based on comparison with patterns may be performed first and, in case of unsolved wake situation, the method based on estimating wind directions may be performed second. Since the wind conditions are more constant, in most cases the method based on comparison with patterns will solve the wake situation. In exceptional cases, the method based on comparison with patterns may not produce a solved wake situation, in which case the method based on estimating wind directions may be secondly performed. This execution in series offers e.g. the advantage of producing results in a very short time in most cases, and the advantage of not requiring as many computing resources as the parallel approach described in the previous paragraph.

Moreover, since a common repository of patterns is shared by both methods (the one based on patterns obtaining patterns from it, and the one based on wind directions storing new patterns into it), combinations of methods based on wind directions and methods based on patterns may be considered self-learning processes. In this sense, the method based on estimating wind directions may be seen as the one providing intelligence to the overall process, whereas the method based on patterns may be seen as a simpler but faster method which uses the knowledge generated by the method based on estimating wind directions. This knowledge is transferred from the method based on wind directions to the method based on patterns through the common repository of patterns.

Another advantage of this repository is that a computer program suitable to perform an embodiment combining a method based on wind directions and a method based on patterns may be incorporated in a wind farm, initially without any predefined pattern. That is to say, this computer program may be installed in the wind farm with the repository of patterns without any data. In this case, the first executions of the method will produce most results from the method based on wind directions, said results (or knowledge) having been stored in the repository. This way, after a certain number of executions, the repository will reach a certain maturity and the method based on patterns will be able to solve most wake situations. Once such a grade of maturity has been reached, the results may be obtained faster, since the methods based on patterns may be less time consuming than the methods based on wind directions.

For example, patterns may be stored in the repository with tags qualifying the corresponding pattern according to different parameters that can be useful for searching determined profiles of patterns. For example, patterns may be tagged taking into account the number of overloaded wind turbines, the substantial location (e.g. North, South, East or West) of most of the overloaded wind turbines, etc. Proper indexes may be defined according to said tags, such that direct access to determined type of patterns may be performed. For example, if the qualified layout has three overloaded wind turbines which are located in a northern area of the wind farm, the existence of one or more indexes directly leading to the patterns having three overloaded wind turbines located in a northern area will make the process much faster.

In the embodiments in which a method based on estimating wind directions stores solved wake situations into a repository of patterns and wherein a method based on comparison with patterns obtains patterns from said repository, the predefined strategy that has solved the detected wake situation may also be stored into the repository. Moreover, in these embodiments, applying the predefined strategy of adjusting wind turbines operation may comprise obtaining the predefined strategy from the repository of patterns. This way, the knowledge transmitted from a method based on estimating wind directions to a method based on comparison with patterns does not only comprise patterns, but also the predefined strategy which is supposed to solve the wake situation represented by the corresponding pattern.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method for detecting a wake situation in a wind farm comprising a plurality of wind turbines, the method using a map representing a distribution of the wind turbines in the wind farm, wherein one or more of the wind turbines have one or more load sensors, and wherein the wake situation refers to an action of the wind on a wind turbine that produces a wake received by another wind turbine, the method comprising:

obtaining, for one or more of the wind turbines with load sensors, load measurements from the load sensors during a predefined time interval;

obtaining an enriched map of the wind farm by qualifying in the map each wind turbine for which load measurements have been obtained as overloaded or non-overloaded according to the load measurements obtained for the wind turbine;

based on the wind turbines qualified as overloaded in the enriched map, obtaining a set of possible wind directions that could have generated a wake received by at least one of the overloaded wind turbines; and detecting the wake situation by determining the most likely actual wind direction from the set of possible wind directions.

2. The method according to claim 1, wherein obtaining the set of possible wind directions comprises:

obtaining, for each of the overloaded wind turbines, a particular set of possible wind directions that could have generated the wake received by the overloaded wind turbine; and selecting the wind directions that are in all the particular sets of possible wind directions, and taking said selected wind directions as the set of possible wind directions.

3. The method according to claim 1, wherein determining the most likely actual wind direction from the set of possible wind directions comprises:

for each wind direction of the set of possible wind directions, verifying if said wind direction could have generated a wake received by at least one of the wind turbines qualified as non-overloaded in the enriched map, and in case of positive result of said verification, excluding said wind direction from the set of possible wind directions.

4. The method according to claim 1, further comprising:
applying a predefined strategy of adjusting wind turbine operations, wherein the predefined strategy is theoretically suitable for solving the detected wake situation.

5. A method for solving a wake situation comprising iterating the method according to claim 4 until the detected wake situation is solved or an ending condition is satisfied;
wherein determining the most likely actual wind direction comprises excluding the wind directions that have been determined as most likely actual wind directions in previous iterations;
wherein the ending condition is satisfied when all the wind directions of the set of possible wind directions have been determined as most likely actual wind directions in previous iterations; and
wherein the detected wake situation is solved when the enriched map comprises a number of overloaded wind turbines that is less than a predefined threshold of overloaded wind turbines.

6. The method according to claim 5, further comprising:
if the detected wake situation has not been solved, generating an alarm signal.

7. The method according to claim 1, wherein qualifying in the map each wind turbine for which load measurements have been obtained as overloaded or non-overloaded comprises:
calculating an average load for each of said wind turbines for which load measurements have been obtained; and
qualifying in the map each of said wind turbines as overloaded or non-overloaded according to the average load calculated for the wind turbine.

8. The method according to claim 7, wherein obtaining the set of possible wind directions comprises:
obtaining, for each of the overloaded wind turbines, a particular set of possible wind directions that can theoretically generate a wake that can be received by the overloaded wind turbine;
selecting the wind directions that are in all the particular sets of possible wind directions, and taking said selected wind directions as the set of possible wind directions;
wherein determining the most likely actual wind direction from the set of possible wind directions comprises
for each wind direction of the set of possible wind directions, verifying if said wind direction could have generated a wake received by at least one of the non-overloaded wind turbines, and
in case of a positive result of said verification, excluding said wind direction from the set of possible wind directions; and
wherein the method further comprises:
applying a predefined strategy of adjusting wind turbine operations, wherein the predefined strategy is theoretically suitable for solving the detected wake situation.

9. A method for solving a wake situation comprising iterating the method according to claim 8 until the detected wake situation is solved or an ending condition is satisfied;
wherein determining the most likely actual wind direction comprises excluding the wind directions that have been determined as most likely actual wind directions in previous iterations;
wherein the ending condition is satisfied when all the wind directions of the set of possible wind directions have been determined as most likely actual wind directions in previous iterations; and
wherein the detected wake situation is solved when the enriched map comprises a number of overloaded wind turbines that is less than a predefined threshold of overloaded wind turbines.

10. A method for detecting a wake situation in a wind farm comprising a plurality of wind turbines by using a map representing a distribution of the wind turbines in the wind farm, wherein one or more of the wind turbines have one or more load sensors, and wherein the wake situation refers to an action of the wind on a wind turbine that produces a wake received by another wind turbine; the method comprising:
obtaining, for one or more of the wind turbines with load sensors, load measurements from the load sensors during a predefined time interval;
obtaining an enriched map of the wind farm by qualifying in the map each wind turbine for which load measurements have been obtained, as overloaded or non-overloaded according to the load measurements obtained for the wind turbine;
comparing the enriched map with predefined wake situations, and producing a set of matched predefined wake situations according to predefined matching criteria; and
detecting the wake situation by selecting one of the predefined wake situations from the set of matched predefined wake situations according to predefined selection criteria.

11. The method according to claim 10,
wherein qualifying in the map each wind turbine for which load measurements have been obtained as overloaded or non-overloaded comprises:
calculating an average load for each of said wind turbines for which load measurements have been obtained; and
qualifying in the map each of said wind turbines as overloaded or non-overloaded according to the average load calculated for the wind turbine; and
wherein the method further comprises:
applying a predefined strategy of adjusting wind turbine operations, wherein the predefined strategy is theoretically suitable for solving the detected wake situation.

12. A method for solving a wake situation comprising iterating the method according to claim 11 until the detected wake situation is solved or an ending condition is satisfied;
wherein selecting one of the predefined wake situations from the set of matched predefined wake situations comprises excluding predefined wake situations selected in previous iterations;
wherein the ending condition is satisfied when all the predefined wake situations of the set of matched predefined wake situations have been selected in previous iterations; and
wherein the detected wake situation is solved when the enriched map comprises a number of overloaded wind turbines that is less than a predefined threshold of overloaded wind turbines.

13. A system configured for detecting a wake situation in a wind farm according to the method of claim 10.

14. A wind farm comprising a plurality of wind turbines, wherein one or more of the wind turbines have one or more load sensors, and wherein the wind farm also comprises a system according to claim 13.

15. The method according to claim 10, further comprising:
applying a predefined strategy of adjusting wind turbine operations, wherein the predefined strategy is theoretically suitable for solving the detected wake situation.

16. A method for solving a wake situation comprising iterating the method according to claim 15 until the detected wake situation is solved or an ending condition is satisfied;
wherein selecting one of the predefined wake situations from the set of matched predefined wake situations comprises excluding the predefined wake situations selected in previous iterations;

wherein the ending condition is satisfied when all the predefined wake situations of the set of matched predefined wake situations have been selected in previous iterations; and wherein the detected wake situation is solved when the enriched map comprises a number of overloaded wind turbines that is less than a predefined threshold of overloaded wind turbines.

17. A method for solving a wake situation, comprising:
performing the method according to claim 16, wherein
comparing the enriched map with predefined wake situations comprises obtaining the predefined wake situations from a repository; and
iterating a second method for detecting a wake situation in a wind farm until the detected wake situation is solved or an ending condition is satisfied; wherein
based on the wind turbines qualified as overloaded in the enriched map, obtaining a set of possible wind directions that could have generated a wake received by at least one of the overloaded wind turbines,
detecting the wake situation by determining the most likely actual wind direction from the set of possible wind directions,
applying a predefined strategy of adjusting wind turbine operations, wherein the predefined strategy is theoretically suitable for solving the detected wake situation, and
if the detected wake situation has been solved, storing the enriched map as a predefined wake situation into the repository; wherein
determining the most likely actual wind direction comprises excluding the wind directions that have been determined as most likely actual wind directions in previous iterations; wherein
the ending condition is satisfied when all the wind directions of the set of possible wind directions have been determined as most likely actual wind directions in previous iterations; wherein
the detected wake situation is solved when the enriched map comprises a number of overloaded wind turbines that is less than a predefined threshold of overloaded wind turbines.

18. The method according to claim 17, wherein:
storing the enriched map as the predefined wake situation also comprises storing the predefined strategy that has solved the detected wake situation into the repository; and
wherein applying the predefined strategy of adjusting wind turbine operations comprises obtaining the predefined strategy from the repository.

19. A system for detecting a wake situation in a wind farm comprising a plurality of wind turbines, by using a map representing a distribution of the wind turbines in the wind farm, wherein one or more of the wind turbines have one or more load sensors, wherein the wake situation refers to an action of the wind on a wind turbine that produces a wake received by another wind turbine, and wherein the system is configured to perform a method comprising:
obtaining, for one or more of the wind turbines with load sensors, load measurements from the load sensors during a predefined time interval;
obtaining an enriched map of the wind farm by qualifying in the map each wind turbine for which load measurements have been obtained, as overloaded or non-overloaded according to the load measurements obtained for the wind turbines;
based on the wind turbines qualified as overloaded in the enriched map, obtaining a set of possible wind directions that could have generated a wake received by at least one of the overloaded wind turbines; and
detecting the wake situation by determining the most likely actual wind direction from the set of possible wind directions.

20. A wind farm comprising a plurality of wind turbines, wherein one or more of the wind turbines have one or more load sensors, and wherein the wind farm also comprises a system according to claim 19.

\* \* \* \* \*